April 2, 1946.  J. Y. BLAZEK ET AL  2,397,642

CLUTCH PLATE

Filed March 20, 1943

INVENTORS.
John Y. Blazek and
Gilbert E. Sears

BY Fay Gohrick, Williams
Chilton and Isler
ATTORNEYS.

Patented Apr. 2, 1946

2,397,642

UNITED STATES PATENT OFFICE 2,397,642

CLUTCH PLATE

John Y. Blazek, Bedford, and Gilbert E. Sears, Cleveland, Ohio, assignors to Lempco Products, Inc., Bedford, Ohio, a corporation of Ohio Application March 20, 1943, Serial No. 479,864

5 Claims. (Cl. 192—68)

This invention is directed to clutch plates, but has reference more particularly to clutch plates having improved means for dampening torsional vibrations between driving and driven members through which torque is transmitted by a friction clutch.

It is recognized by those skilled in the clutch art that abrupt or sudden changes in the torque of the driving member from that of the driven member are a cause of unnecessary wear and tear not only to the clutch and the driving mechanism, but also to the driven mechanism. In order to cushion or dampen these differences in torque which result in vibrations or jerks, springs have been incorporated into the driving element of the clutch plate which also includes numerous plates, spacers, rivets and pins as is well-known in the motor vehicle field.

The primary object of our invention is to provide a clutch plate suitable for use in motor vehicles, such as pleasure cars, trucks, busses and the like, having novel and improved means which will effectively absorb torsional vibrations of slight magnitude and effectively reduce torsional vibrations of great magnitude.

A secondary object of the invention is to accomplish the primary object with a reduction in cost over the cost of corresponding clutches of the torsional vibration dampening type heretofore known and also with simplification of the manufacturing process.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various structural forms in which the principle of the invention may be used.

Figure 2:
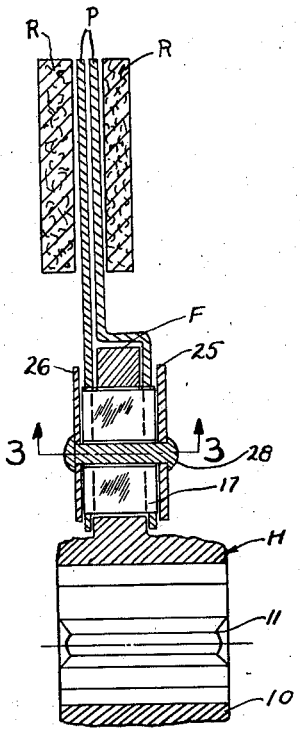
Fig. 2 is a fragmentary sectional view, along the line 2—2 of Fig. 1, showing the elements of Fig. 1 in assembled relation in a clutch plate suitable for use in a motor vehicle.
Figure 4:
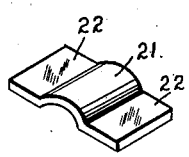
Fig. 4 is a perspective view of one element of the clutch plate of Fig. 1.
Figure 3:
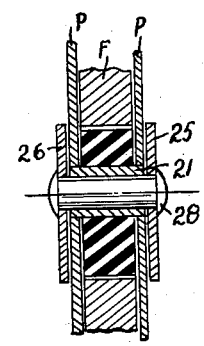
Fig. 3 is a fragmentary sectional view, along the line 3—3 of Fig. 2.

Referring now to the drawing and more specifically to Fig. 2 thereof, there will be seen an assembled clutch plate adapted for use in modern motor vehicles and having incorporated therein the features of the present invention. The assembled clutch plate in general includes a hubbed element, indicated generally by the reference character H, having a radially extending peripheral flange F on both sides of which are annular plates P which carry flat friction rings R for drivingly engaging a flywheel or the like.

Referring now to Figs. 1 through 4, the hubbed element H will be seen to comprise a rotatable hub portion 10 having suitable means such as splines 11 for drivingly engaging a shaft. Integral with or otherwise secured to the hubbed portion is the flange F which is provided with a suitable number of evenly spaced openings 14, there being six such openings shown. Within each of such openings is resilient material in the form of two pieces of rubber 16 and 17 and a socket made up of two rigid elements 18 and 19 each of which has a central section 21 substantially semi-circular and flat radially-extending arms 22, one of such elements being clearly seen in Fig. 4. The rubber and the sockets entirely occupy the openings and are manually or otherwise insertable as long as sufficient snugness is present and undue freedom of movement of the socket with respect to the flange F is eliminated, the sockets being movable only upon deformation of one of the pieces of rubber 16 or 17. The pieces of rubber preferably terminate at the axial faces of the flange and thus are retained against axial movement not only by their own deformative forces, but also by the plates P. The sockets preferably extend beyond the axial faces of the flange and project into opening of the plates P, as is clearly seen in Figs. 2 and 3 and are retained against axial movement not only by the deformation of the rubber, but also by retaining discs 25 and 26 which contribute to the general rigidity of the entire clutch plate. Suitable keys 28, such as bolts, pins or rivets, retain the discs and snugly pass through the sockets.

Figure 1:
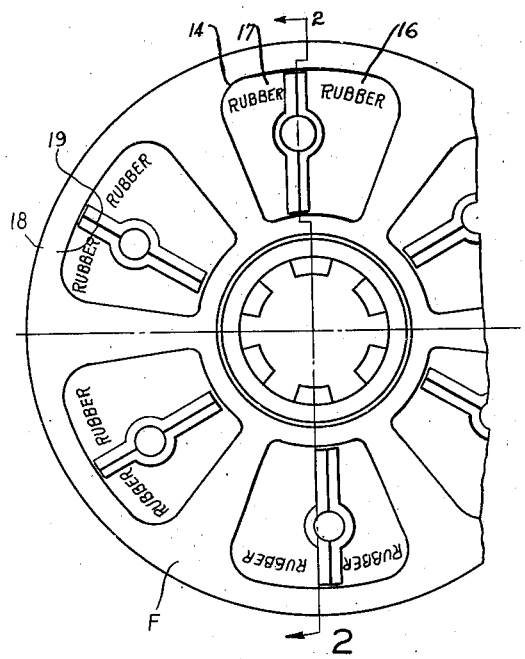
Fig. 1 is a fragmentary front elevation of our torsional vibration dampening means.

It will be understood that both the rubber and the sockets may terminate at the axial extremities of the openings 14, with or without the elimination of the discs 25 and 26, and in such event the keys 28 would be the only elements interconnecting the plates P and the assembled hubbed element as the latter is seen in Fig. 1.

We prefer to employ more rubber for driving the sockets in their normal or frontward direction than we employ for driving the sockets in their reverse direction, although we are aware that the rubber would cushion torsional vibrations in either direction as long as rubber is on both sides of the sockets. Obviously rubber on only one side would cushion in only one direction. Thus, in Fig. 1, the sockets would drive the flange in a clockwise direction.

As shown in Fig. 1, the normal driving face of the arms 22 of the sockets are radial and thus are substantially perpendicular to the initial torque vector. Since these arms extend substantially from the inner to the outer walls of the openings 14, the pieces of rubber are acted upon substantially in their entirety and not merely locally. If desired, the rubber may be vulcanized or otherwize secured to either the sockets or the walls of the openings.

The openings 14 as shown, have plane side or circumferentially spaced walls which are radial, and arcuate inner and outer or radially spaced walls. We have considered other shapes for these openings, such as circular and parallelogramic with inner and outer walls perpendicular to the initial torque vector, and although the latter and other forms would not depart from our invention, yet we prefer the form shown.

From the foregoing it is obvious that the rubber will absorb or dampen torsional vibrations between the driving and driven members and more specifically between the plates P and the flange F, because all torque, forward or backward, must pass through the rubber.

The simplicity of our assembled hubbed element, as seen in Fig. 1, makes it a separate sub-assembly of the whole clutch plate and makes for ready, easy and economical manufacture.

Other forms may be employed embodying the features of our invention instead of those herein explained, change being made in the form or construction, provided the elements stated by any of the following claims or the equivalent of such stated elements be employed.

We therefore particularly point out and distinctly claim as our invention:

1. A clutch plate comprising a hubbed element presenting a peripheral flange having openings therein, the inner and outer walls of said openings being arcuate, sockets movably disposed in said openings and extending substantially to said walls, rubber in each of said openings and disposed on both sides of said sockets and extending substantially therefrom to the side walls of each of said openings, and a friction plate driven by said sockets whereby torsional vibrations between said element and said friction plate are dampened by said rubber.

2. A clutch plate comprising a hubbed element presenting a peripheral flange having openings therein, each opening presenting two radially spaced walls and two circumferentially spaced walls, sockets, one socket being movably disposed in each of said openings and extending substantially the distance between the two radially spaced walls of each of said openings, resilient material on both sides of each of said sockets and extending therefrom to the two circumferentially spaced walls of each of said openings, there being more resiliency of one side of each of said sockets than on the other side of said sockets, and a friction plate drivingly connected to said sockets whereby torsional vibrations between said flange and said friction plate are dampened by said material and the normally driven side of said sockets dampens torsional vibrations to a greater degree than the other side of said sockets.

3. In a clutch, a hub member having a radially extending section, said section having an opening therein; a resilient body in said opening, one edge of said body abutting a radially extending wall of said opening; a member in said opening, said member comprising a central portion and web-like portions extending on opposite sides of said central portion, said web-like portions extending along an edge of said resilient body opposite said one edge thereof whereby said resilient body may be compressed between said member and said wall of the opening by torsional stress between said member and hub; a plate and means for securing said plate to said central portion of said member.

4. In a clutch, a hub member having a radially extending section, said section having an opening therein; a pair of resilient bodies in said opening, one edge of one of said bodies abutting a radially extending wall of said opening and one edge of the other of said bodies abutting the opposite radially extending wall of said opening, said bodies having confronting, radially extending edges; an element disposed in said opening and intermediate said resilient bodies, said element including a central portion and web-like portions extending on opposite sides of said central portion and radially in said opening with respect to the hub, said web-like portions being resiliently engaged by said confronting edges of said resilient bodies; a plate; and means for connecting said plate with the central portion of said element.

5. In a clutch, a hub member having a radially extending section, said section having an opening therein; a pair of resilient bodies in said opening, one edge of one of said bodies abutting a radially extending wall of said opening and one edge of the other of said bodies abutting the opposite radially extending wall of said opening, said bodies having confronting, radially extending edges; an element comprising two complementary members each having a semi-cylindrical section at the central portion thereof and web-like portions extending in opposite directions from said central portion, said members being disposed intermediate said resilient bodies with the web-like portions of one member abutting one of said confronting edges of said bodies and the web-like portions of the other of said members abutting the other of said confronting edges of said resilient bodies, said members being yieldingly retained in abutting relation by said resilient bodies and disposed with said semi-cylindrical sections in registration for presenting a tubular openings; a plate; and means for securing said plate to said element, said means including a pin extending through said tubular opening.

JOHN Y. BLAZEK.
GILBERT E. SEARS.